Patented Sept. 8, 1925.

1,552,744

UNITED STATES PATENT OFFICE.

FRANZ JORDAN, OF WICKEDE-RUHR, GERMANY.

METHOD OF SOFTENING IRON PLATED WITH ALUMINUM.

No Drawing. Application filed June 26, 1924. Serial No. 722,528.

*To all whom it may concern:*

Be it known that I, FRANZ JORDAN, a citizen of the German Empire, residing at Wickede-Ruhr, Germany, have invented a new Method of Softening Iron Plated with Aluminum, of which the following is a specification.

My invention relates to a process of softening iron plated with aluminum by annealing and it is an object of my said invention to provide a process by which plates, bands, wire, bars, tubes etc. of iron plated with aluminum may be rolled to the thinnest sections.

Heretofore, the annealing of iron so plated involved the difficulty that the temperature at which the iron must be annealed when it has become hard by rolling is 800 to 900 centigrade whereas the melting point of aluminum is about 700 centigrade. Therefore, it has been proposed to anneal at about 600 centigrade only and to make up for the lower temperature by longer duration of annealing, and by using very soft iron. This solution, however, was not satisfactory as after several passes and annealings a condition was attained where the iron could not be softened by any means. Plate could only be reduced to about .5 millimetres by this process and by uneconomic means.

I have found that a plating of aluminum on iron resists temperature much better than pure aluminum. It is possible to anneal fagots in an air tight furnace to about 750 centigrade without any melting or burning of the plating. This temperature would not be sufficient for making the plated iron soft and able to be rolled. On further investigation, I have found that it is possible to utilize the thermic properties of aluminum in this respect. By these means, the problem is solved perfectly.

The specific heat of aluminum is about twice that of iron so that it acts as a strong heat concentrating agent on the iron, making up for the low annealing temperature and reducing the rate of cooling which is very important for complete annealing.

It is old in the art to soften iron by heating the iron plates in air tight containers (annealing boxes) and allowing to cool in the boxes without admitting cooling air.

In my invention, the plates, etc., of iron plated with aluminum are also heated in air tight boxes with indirect heating to avoid impingement of flame, for instance in a muffle furnace, to about 750 centigrade for a certain period and then allowed to cool as slowly as possible, the process being supported by the high specific heat of aluminum.

In my improved process the iron plates, etc., plated with aluminum become softer than can be attained in unplated iron plates unless special qualities of iron are used.

I claim:

1. A method of softening iron plated with aluminum which consists in heating out of contact of air the plated iron to a temperature which is above the melting point of aluminum but below the normal critical temperature range of iron, and then very slowly cooling the plated iron.

2. A method of softening iron plated with aluminum which consists in heating out of contact of air the plated iron to a temperature which is below the normal critical temperature range of iron, and then very slowly cooling the plated iron.

In testimony whereof I have signed my name to this specification.

FRANZ JORDAN.